(12) United States Patent
Barnes

(10) Patent No.: US 10,984,491 B2
(45) Date of Patent: Apr. 20, 2021

(54) KEY FOB AND SYSTEM FOR INDICATING RENTAL PROPERTY STATUS AND UPDATES

(71) Applicant: Melvin Barnes, Chicago, IL (US)

(72) Inventor: Melvin Barnes, Chicago, IL (US)

( * ) Notice: Subject to any disclaimer, the term of this patent is extended or adjusted under 35 U.S.C. 154(b) by 215 days.

(21) Appl. No.: 16/136,886

(22) Filed: Sep. 20, 2018

(65) Prior Publication Data
US 2019/0057467 A1    Feb. 21, 2019

Related U.S. Application Data

(63) Continuation-in-part of application No. 14/461,396, filed on Aug. 16, 2014, now abandoned.

(51) Int. Cl.
| | |
|---|---|
| *G06Q 50/16* | (2012.01) |
| *H04L 12/58* | (2006.01) |
| *G06F 21/35* | (2013.01) |
| *G06F 21/31* | (2013.01) |
| *H04L 12/18* | (2006.01) |
| *G06F 21/34* | (2013.01) |
| *G07C 9/27* | (2020.01) |
| *G07C 9/29* | (2020.01) |
| *G06Q 30/06* | (2012.01) |
| *G06Q 50/18* | (2012.01) |

(52) U.S. Cl.
CPC ........... *G06Q 50/163* (2013.01); *G06F 21/31* (2013.01); *G06F 21/34* (2013.01); *G06F 21/35* (2013.01); *G06Q 30/0645* (2013.01); *G06Q 50/182* (2013.01); *G06Q 50/188* (2013.01); *G07C 9/27* (2020.01); *G07C 9/29* (2020.01); *H04L 12/1895* (2013.01); *H04L 51/04* (2013.01); *H04L 51/046* (2013.01)

(58) Field of Classification Search
CPC ............. G06Q 30/0645; G06Q 50/163; G06Q 50/188; G06Q 50/182; G07C 9/27; G07C 9/29; G06F 21/31; G06F 21/35; H04L 12/1895; H04L 51/04; H04L 51/046
USPC ........................................................ 705/313
See application file for complete search history.

(56) References Cited

U.S. PATENT DOCUMENTS

| | | | | |
|---|---|---|---|---|
| 5,986,564 A * | 11/1999 | Fraser | ................ | G07C 9/00722 340/5.6 |
| 2003/0198938 A1* | 10/2003 | Murray | ............... | H04L 12/2803 434/429 |

(Continued)

OTHER PUBLICATIONS

OSxDaily, "Set iPhone Camera LED to Flash on Incoming Calls and Alerts," [online], available at: < https://osxdaily.com/2011/10/21/set-iphone-camera-led-to-flash-on-incoming-calls-and-alerts/ > (Year: 2011).*

(Continued)

*Primary Examiner* — Richard W. Crandall
(74) *Attorney, Agent, or Firm* — Fraline J. Allgaier

(57) ABSTRACT

Disclosed is a method for providing rental property network members and existing tenants real-time response alerts to rental property database inquiries, status, and updates. A secured website having a rental property database is operable to send signals to a programmable key fob having a color-coded alert board, a plurality of depressable color signals, audio output capabilities, and vibration capabilities. The signals are coordinated with changes to a tenant's or network member's status on the secured website.

15 Claims, 13 Drawing Sheets

(56) References Cited

U.S. PATENT DOCUMENTS

| | | | | |
|---|---|---|---|---|
| 2005/0258934 | A1* | 11/2005 | Buck | G07C 9/00309 |
| | | | | 340/5.23 |
| 2009/0231094 | A1* | 9/2009 | Higgins | G07C 9/00309 |
| | | | | 340/5.64 |
| 2011/0015954 | A1* | 1/2011 | Ward | G06Q 10/10 |
| | | | | 705/5 |
| 2014/0375422 | A1* | 12/2014 | Huber | G07C 9/00571 |
| | | | | 340/5.61 |
| 2016/0134737 | A1* | 5/2016 | Pulletikurty | G06F 3/0227 |
| | | | | 715/735 |

OTHER PUBLICATIONS

"Simon Says" Youtube.com [online], published on Dec. 9, 2007, available at: < https://www.youtube.com/watch?v=4YhVyt4q5HI > (Year: 2007).*

Budget Keychains, "Personalized Automobile Keychains," [online], archived on Jun. 24, 2014, available at: < https://web.archive.org/web/20140624003651/https://www.budgetkeychains.com/Personalized-Automobile-Keychains > (Year: 2014).*

* cited by examiner

The Landlord Financial Recovery Bureau uses information within the Member Verification Agreement to do a background check. This may include a credit check and/or a title search. If there are more than one name listed on the title then only one person needs to apply for membership. As a result of these actions, the application fee is non-refundable. The Landlord Finacial Recovery may request an applicant to provide additional information for the purpose of confirmation.

Directions Landlords are required to complete Section A only. Management Services that own rental property are required to complete both Section A&B. Management Services that do not own rental property are required to complete Section B only. Once these preceedings begin, you will be ineligible to receive a refund.

Section A
Provide Contact Information
First Name_____Last Name_____
Address_____
City_____State_____Zip Code_____
Phone Number_____
Email Address_____

To permit the Landlord Finacial Recovery Bureau to run the credit check. Print your name your social security number and provide your signature on the line below.

Your Social Security Number_____-_____-_____

Provide Contact Information
First Name_____Last Name_____
Address_____
City_____State_____Zip Code_____
Phone Number_____
Email Address_____

Provide Name of Contact Person

First Name_____Last Name_____
First Name_____Last Name_____

Provide your Tax I.D. number on the line below.

Tax I.D. Number_____

SEND

FIG. 7

AMENDMENT
REPLACEMENT SHEET
14/461,396

22

Rental Property Listing

Provide the address of Rental Property of the Property

Address_____
City_____State_____Zip Code_____
Phone Number_____

Provide the property tax I.D. on the line below.

_____

If the title of the property is recoreded in the name of a corporation. Provide the name of the corporation and the tax I.D. on the line below. If not, check No in the circle below.

Corporate Name_____

| Click here after the last address has been provided. |

| Click here to apply an additonal property to the list. |

THE LANDLORD FINACIAL RECOVERY BUREAU
OCCUPANCY REPORT

▲

Provide the following.

Date the Lease was Established……..Month 01 Day 06 Year 12

The Amount of Security Deposit………………..$750.00 Dollars

The Day of the month rent is due……………….. 1st of the Month

Original Amount for Rent…………………….....$750.00 Per Month
Current Amount for Rent…………………........$750.00 Per Month Provide the number of Primary Tenants……………………….. 2
Provide the number of Primary Co-Tenants……………..…….. 0
The Landlord Financial Recovery Bureau define Primary Tenant as the individuals listed on the lease. All other tenants that reside with them are defined as co-tenants. This also includes children and roommates.

The Address of the Rental Property

Address…………………………………....…. 100 S. East Str.

City……………………………………………..…..Bellwood

State……………………………………………..…..IL.

Tenant's E-mail Address…………….._____
*E-mail Address is optional*

Tenant's Phone Number………………….…(312)555-5555

UPDATING FACTS REPORT
RENT INCREASE

Provide the following.

1. Name of Management Service <u>Bigg's Management</u>
2. Management Service Pass Code <u>29864674</u>
3. Landlord's Name <u>Kent Smith</u>
4. LandLord's Pass Code _____
5. The Name of the Tenant <u>Jack Stalen</u>_____
6. The address of the Rental Property <u>100 S. West Str.</u>
   City__<u>Chicago</u>__State_____
7. Provide the new amount of rent the tenant agreed to pay each month in the field below.

<u>$750.00 Dollars</u>

Whenever the management services updates tenant's fact report, a notice is sent out to the tenant. A statement of confirmation and a copy of the fact report will be sent to both the landlord and the management service. Would you like your confirmation statement and fact report sent to you by e-mail or through the U.S. Postal Service.

Select one of the following.

Then click SEND to conclude the session.

- Send Confirmation and fact report by U.S. Postal Service
o Send confirmation and fact report by Email.

SEND

FIG. 10

TENANT FACT REPORT                                                              22

| SECTION A<br>Identification<br><br>Name of the Applicant<br>Tim Jones<br><br>Applicant's Social Security Number<br>Confirmed<br><br>Physical Appearance<br>Gender/Male<br>Ethnicity/Black<br>Height/ 6 to 7 ft. tall<br>Age Range/Mid 30s<br>Skin Complexion/Dark<br>Birth Place/Chicago, IL<br><br>PHOTO UNAVAILABLE<br><br>Entity that crated the Fact Report<br>Landlord | SECTION B<br>Basic Details of the Lease<br><br>Name of the Landlord<br>Ron Donald<br><br>Date the Lease was Established<br>01/06/10<br><br>Total Number of Primary Tenants.......... 2<br>Total Number of Co-Tenants................ 0<br>The Amount of Security Deposit<br>$750.00 Dollars<br>The Original Amount for Rent<br>$750.00 Dollars Per Month<br>The Current Amount for Rent<br>Same<br>The Date of the month the rent is due<br>1st of the month<br>The Address of the Rental Property<br>1 South East Str. Bellwod, IL<br>Month and year current lease was renewed<br>NOT ON FILE<br>Month and year the tenant moved out<br>04/2010 | SECTION C<br>Inquires<br>Number of Inquiries for 20012 2<br>Total Number of Primary Tenants2<br>Total Number of Co-Tenants 0<br>The Amount of Security Deposit<br><br>#1. Name Ron Donald<br>Date of Inquiry<br>12/16/09<br>Contact Info<br>ron@gmail.com<br><br>#1. Name<br>Reed's Management Service<br>Date of Inquiry<br>01/16/10<br>Contact Info<br>Phone#: 312-721-9889 |
|---|---|---|

SECTION D
Litigation and Financial Recovery of Back Rent and/or Property Damages INTENT TO FILE AN ENVICTION
April 15, 2010 the landlord reported that they intended to file for an eviction along with a suit for back rent.
TENANT's RESPONSE
April 18, 2010, the tenant reported that they would be willing to move out before the end of the month if the landlord agrees not to file for an eviction.

EVICTION RESOLVED
April 18, 2010, the landlord agrees to the terms.

38

KEY FOB AND SYSTEM FOR INDICATING RENTAL PROPERTY STATUS AND UPDATES

RELATED APPLICATIONS

This application is a continuation-in-part of U.S. Utility patent application Ser. No. 14/461,396 filed Aug. 16, 2014 and is pending.

FIELD OF THE INVENTION

This application relates generally to the retrieval of real property information and more particularly to a new method for providing rental property network members and existing tenants real-time response alerts to real property status and updates by means of a key fob.

Currently there are millions of vacant and abandoned properties in cities throughout the United States. This affects the social health of a community, quality of life, and the general physical well being of individuals.

The rate of housing development or decline can also affect the rate of job development in residential construction, non-residential construction and engineering. Other sectors are also negatively influenced by the decline in the construction industry. There can be a marked decline of jobs in the manufacturing sector, wood product production, retail trade, architecture and private services.

Neighborhoods, communities and schools are the social institutions that tie people together and promote social progress. The cost of housing is the greatest single expenditure for families and individuals. In particular, low-income individuals often spend as much as 60% or more of their income on housing. Often times, the funds are spent on low quality and unsafe housing.

The rapid urbanization of most American cities also necessitates the improvement of housing for poor and working class families. This involves ensuring that most people can find affordable and quality housing where they work, go to school or raise their families.

In order to facilitate the exchange of information between existing tenants, landlords, and individuals with similar rental property interests, a secured website with verified rental property information operates in cooperation with a key fob having a color-coded alert board and a plurality of depressable color signals, audio output capabilities, and vibration capabilities. The key fob provides coordinated alerts with specified changes on the secured website based on any series of events or changes for a specific rental property transaction or relationship.

There are numerous types of software being marketed to provide tenant screening and tenant risk information. Most of these products use consumer reports that include information about a person's credit characteristics, lifestyle and general reputation. For example, the Landlord Protection Agency provides information about a tenant by providing the landlord's public records, eviction files, and other information about a tenant's lifestyle. The agency stores this information in a database and invites landlords and other interested parties to input information into the database.

The key fob of the present invention is a convenient and secure solution to granting immediate access to the secure website and database. The customized color-coded options for members and existing tenants can provide network members and existing tenants with a real-time response alert to all database inquiries twenty-four hours a day. The device is user friendly and eliminates the wait-time for receiving reports by mail.

SUMMARY

Accordingly, it is an object of the present invention to provide a key fob and system for indicating rental property status and updates to rental property network members and existing tenants.

It is another object of the present invention to provide a key fob and system comprising a secured website having a rental property database being adapted for direct communication with a key fob having a color-coded alert board, with a plurality of depressable color signals and audio output capabilities.

It is another object of the present invention to provide a computer process requiring access codes for accessing the secured database and a key fob for rental property status and updates.

It is another object of the present invention to have said secured website being operable to send signals to a key fob having a color-coded alert board, a plurality of depressable color signals, audio output capabilities, and vibration capabilities coordinated with specified changes on said secured website.

It is another object of the present invention to have rental property network members and existing tenants receiving authenticating information from said secured website and registering said key fob with a service provider to enable two-factor authentication.

It is another object of the present invention to have a secured website that generates one-time-passcodes that alphabetically identify rental property network providers, network members, and existing tenants and the one-time-passcode being displayed on a key fob.

BRIEF DESCRIPTION OF THE SEVERAL VIEWS OF THE DRAWINGS

The foregoing features and other aspects of the invention will become more apparent from the description, taken together with the accompanying drawings, in which:

FIG. 6 shows a request for a landlord's background information and requiring landlords to complete a background, credit check, and title check.

FIG. 7 is an exemplary form providing the rental property ownership of an individual that can be used as a status update.

FIG. 8 is an exemplary form showing the status information of a existing tenant including lease information, address of the rental property, and tenant identifying information.

FIG. 9 is an exemplary form showing status updates that would be placed on the website for an individual rent increase and the name of the individual that made the update.

FIG. 10 is an exemplary status update and evidence locker for a existing tenant as provided by the present invention.

DETAILED DESCRIPTION OF THE INVENTION

Figure 1:
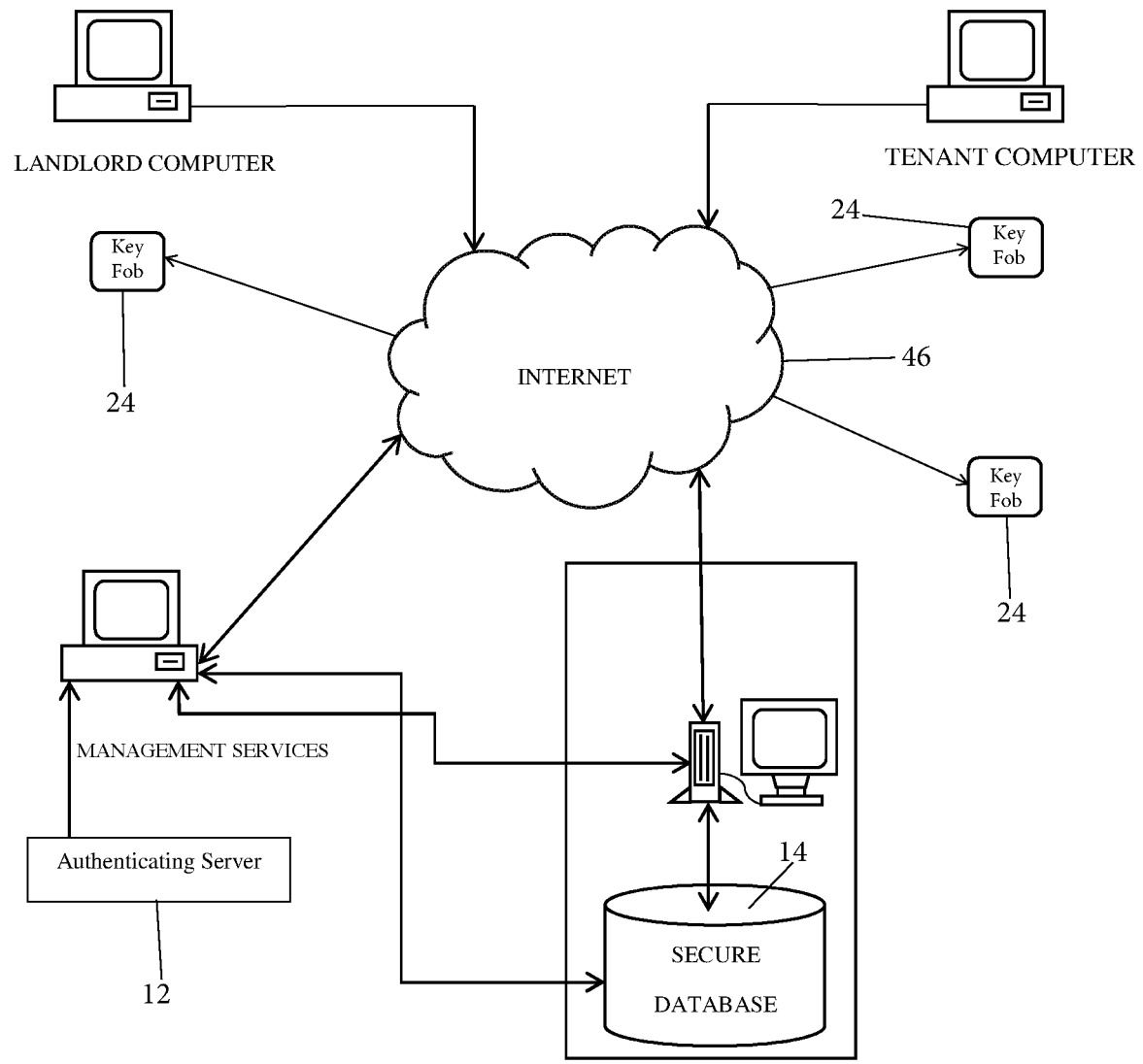
FIG. 1 is a block diagram of a computer network used for disseminating status information for rental property network members and existing tenants.
Figure 2:
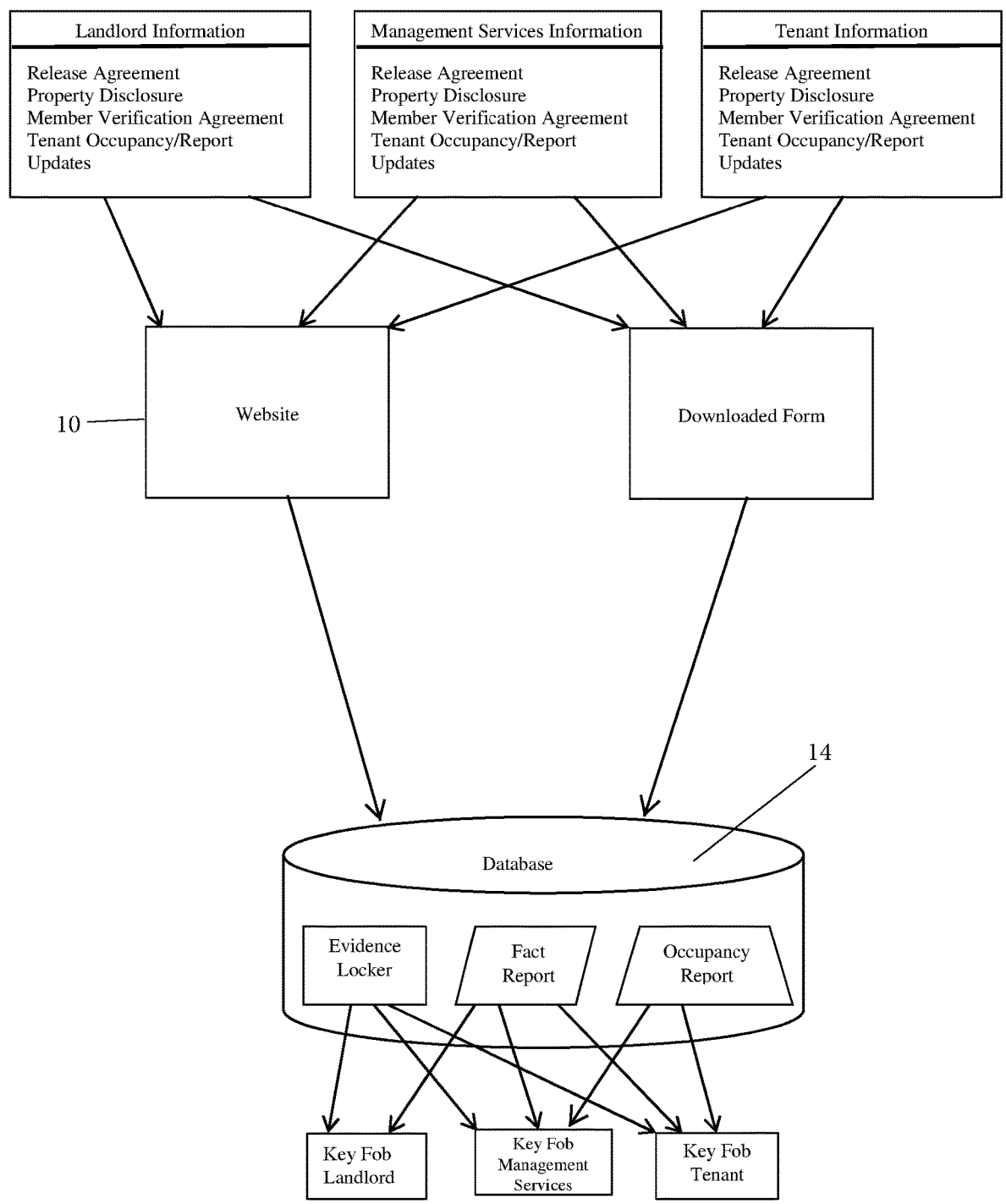
FIG. 2 is a flowchart showing the preferred embodiment of the system for collecting status information.
Figure 3:
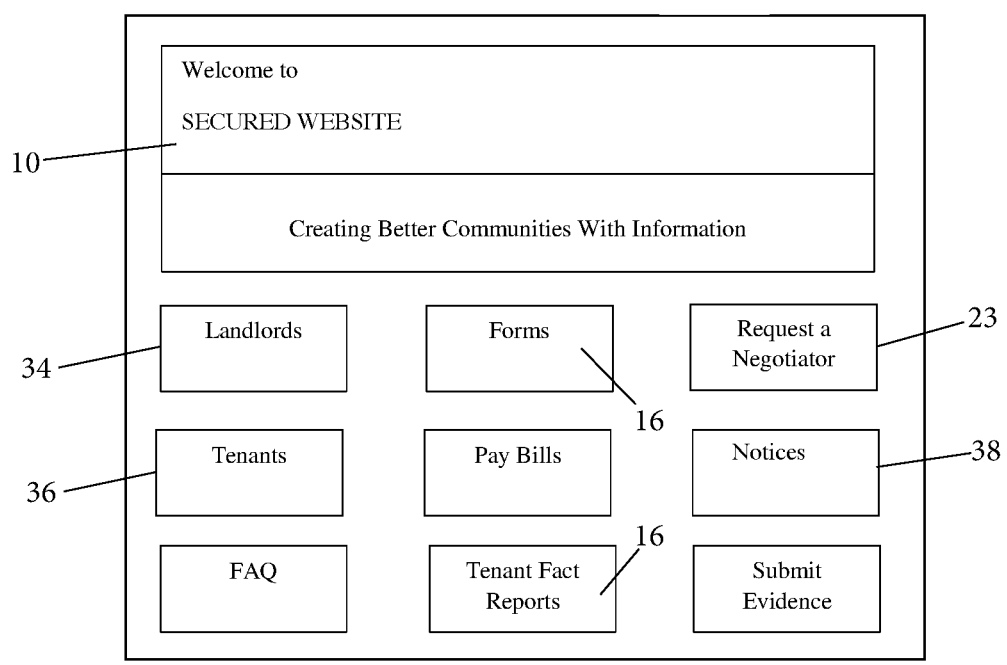
FIG. 3 shows an exemplary website having selection features for submission of status information and the completion of a plurality of forms for verification.

A method for providing rental property network members 34 and existing tenants 36 response alerts to rental property database 14 inquiries, status, and updates is presented. Rental property network members 34 can include rental property management services and landlords. FIGS. 1-3 show a secured website 10 being stored on an authenticating server 12 having the rental property database 14 and storing rental property information 16, tenant records 18, records of rental property network members 22, notices 38, and specific requests 23. Rental property information can include landlord information, tenant information, and a tenant evidence locker. The block diagram in FIG. 1 shows the computer network system being used to host and access the secured website 10.

The secured website 10 that is presented herein is operable to send signals to a key fob 24 having a color-coded alert board 26, a plurality of depressable color signals 32, and audio output 28 capabilities. The audio output 28 capabilities can include beeping alerts and vibration. The vibration capabilities of the key fob 24 can be coordinated with specified changes on the secured website 10. For example, the key fob 24 can be adapted to vibrate after receiving a notification from a specific rental property network member 34 that a document is complete.

The color-coded alert board 26 can further inform users of changes to relevant rental property information 16 such as the completion of a specific landlord document or a completed upload of information into a tenant evidence locker.

Rental property network members 34, existing tenants 36, and other users receive authenticating information 44 from the secured website 10 and register the key fob 24 with the service provider 46 to enable two-factor authentication for future logins. The user visits the secured website 10 using the key fob 24 and obtain a confirmation code through said key fob 24. The user then logs into the website to complete the authentication. The secured website 10 automatically generates a one-time-passcode 48 of pseudo-random alpha-numeric string of characters that authenticates said user for a single transaction. The secured website 10 can further generate a one-time-passcode 48 that alphabetically identifies the rental property network members 34 and the existing tenants 36. This one-time-passcode 48 is being used in addition to a log-in authentication username and password. The one-time-passcode 48 is immediately displayed on the key fob 24 after issuance. The key fob 24 further informs network users to incoming color-coded message codes that are displayed at the bottom center of the fob. Key fob 24 users may receive a plurality of flashing or non-flashing light combinations depending on the flashing color signal 32 of at least one of the color signals 32 on the key fob 24. For example, a tenant 36 may receive a five second flashing green light on the key fob 24 if there are no derogatory items on a tenant record 18. The inventive concept as described herein also provides 28 output such as a beeping sound or flashing of at least one of the color signals 32 on the key fob 24. In that case, the beeping sound or color signal 32 might indicate a positive tenant record 18. The device is adaptable for changes in beeping or sound consistency depending on the nature of such record.

When one tenant 36 receives notice 38 that an eviction is in progress or that five days has passed since his eviction, the yellow light signal of the tenant's 36 key fob 24 might flash continuously until the key fob 24 is reset. This tenant 36 can continue to receive a plurality of light signals wherein the key fob is adjusted to receive such signals based on the changes to the tenant's 36 rental property documents. The key fob 24 vibrates and the tenant 36 or rental property network member 34 receives a non-flashing signal of at least one of the color signals 32 indicating that information or a document is completed and prepared for viewing or printing.

The key fob 24 vibrates and the tenant 36 receives a flashing signal of at least one of the color signals 32 indicating that any specific request on said secured website 10 has been completed. For example, a vibration followed by a five second orange light can signal that all other network reports that are requested by a rental property network member 34 or tenant 36 are complete and ready for review and or printing.

At least one of the light signals produces a variable flash pattern if there are any changes to the rental property information 16 relating to a tenant 36. For example, a yellow light signal can flash three times and them remain a steady yellow light for five seconds if none of the aforementioned changes to the tenant's 36 record occurs. This includes the absence of derogatory items on that tenant's 36 record, the tenant 36 has not been evicted, and the absence of eviction proceedings.

The key fob 24 can have a memory system 42 holding a 40-bit code adaptable for reading and executing the plurality of program codes. The storage medium for said memory system 42 can be a non-volatile memory card 52 with assigned unit values. The key fob 24 has Wi-Fi connecting capabilities 54, Bluetooth connectivity 56, a chargeable power source 58 for use in vehicles or main connection ports, and a universal serial bus port 62. The key fob 24 is further configurable to change said one-time-passcode code 48 at specified time intervals.

Possible modifications to the key fob 24 would be to add other security measures, such as biometric factors, e.g., (fingerprint authentication, facial or voice recognition). Another addition could be a location factor to denote the location from which an authentication attempt is being made, which can be enforced by limiting the authentication attempts to specific devices in a particular location, or by tracking the geographic location source IP (internet protocol) address. Another security option is the possible inclusion of some other geo-location information that could be derived from the user's mobile phone. A time factor restriction could also be added at some future date to restrict the user authentication to a specific time window in which logging on is permitted, and restricting access to the secured website 10 outside of that time frame.

Figure 4:
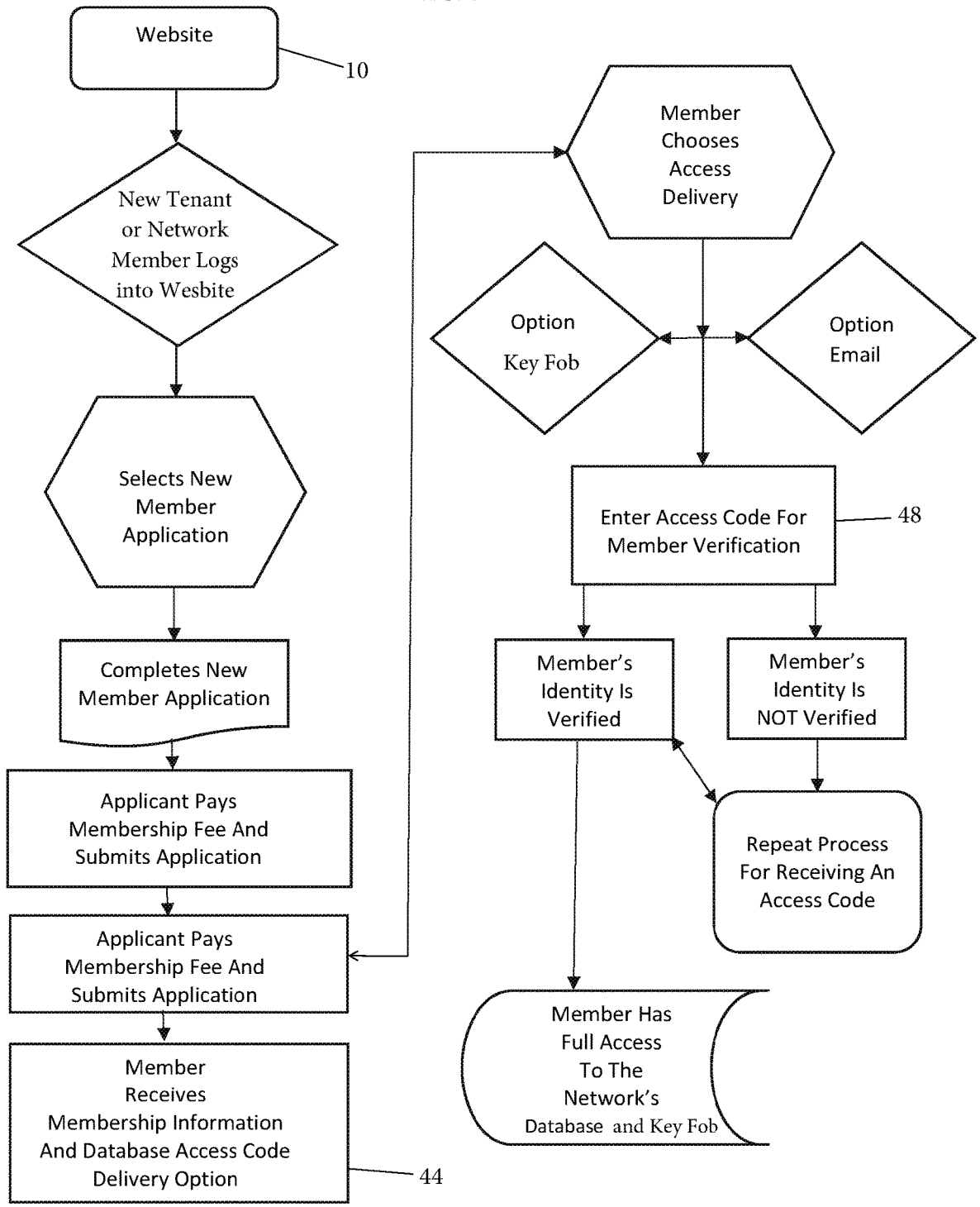
FIG. 4 shows an exemplary member verification process for access to the secured website and key fob.
Figure 5:
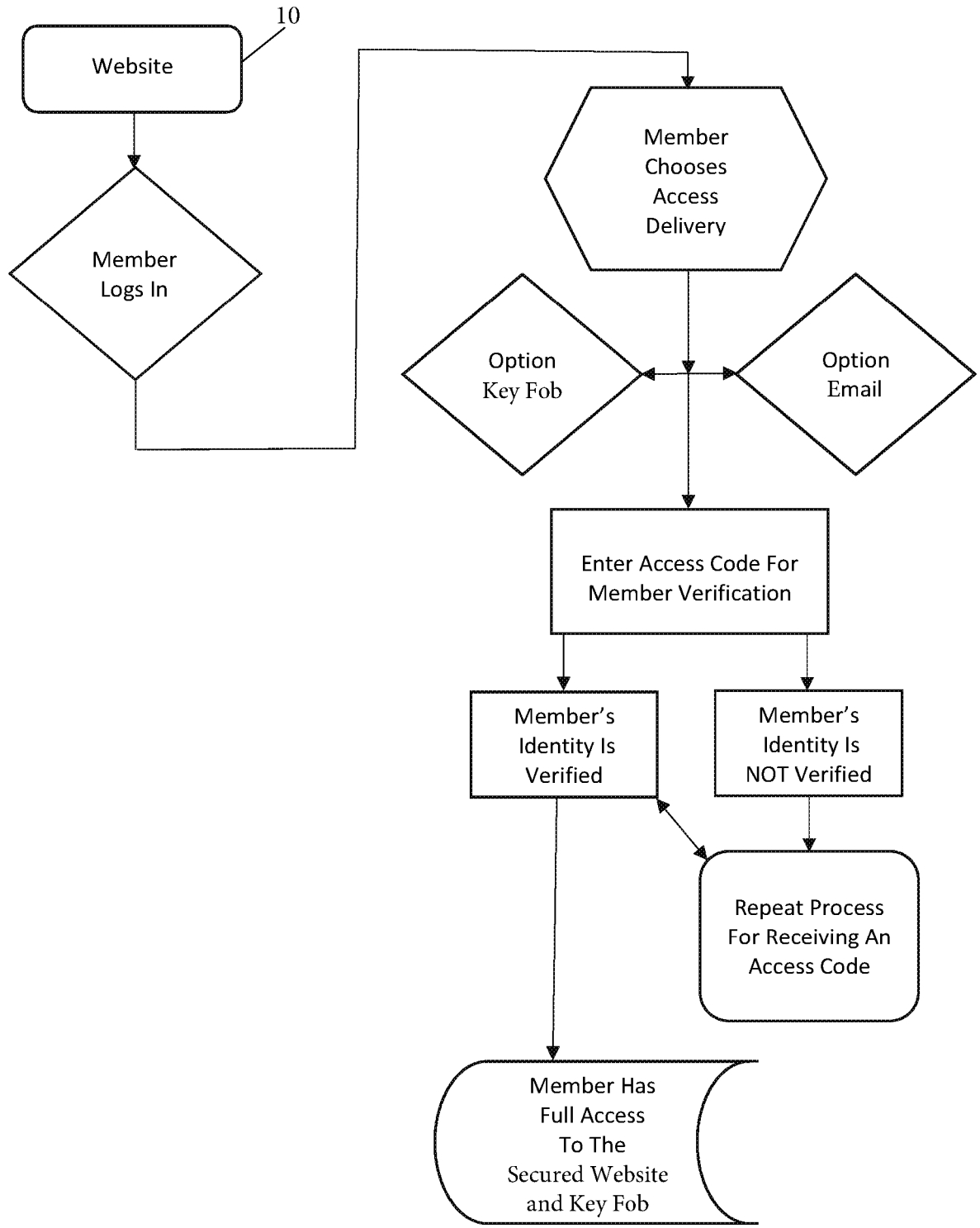
FIG. 5 shows an exemplary log in process for access to the secured website and key fob.

FIGS. 3-4 Shows the details of an exemplary landlord enrollment process including proof of real property ownership and the preferred method for collecting rental property data to support the informational needs of rental property network members 34 and existing tenants 36. Rental property information 16 is collected and stored in the rental property database 14. Network members such as rental property network members 34 and existing tenants 36 can input the information into the rental property database 14 using the secured website 10. Rental property information 16 includes documents relating to tenancy, rental property management or landlord information. Landlord information in FIG. 4 is shown to include a signed release agreement, a property disclosure form requiring the landlord to verify ownership of at least one rental property, a member verification agreement requesting that the landlord agree to a background check and title search of the landlord's real property holdings. The landlord information c a n also include a tenant 36 occupancy report disclosing specific tenant 36 identifying information regarding a lease and additional tenant 36 information. The tenant 36 information can include a photo of the tenant 36, the tenant's 36 name, current address, race, physical description and signed waivers which giving landlords access to the tenant's 36 occupancy report.

FIGS. 8 and 9 show the necessary forms that a landlord could complete before obtaining website membership and making official submissions. The landlord could be required to complete member verification agreements and agree to a background check. This could include a credit check or a title search. During the enrollment process, landlords could be required to provide proof of landlord ownership by completing a rental property listing and to verifying the rental property ownership. The rental property listing shown in 7 shows the address, tax identification and other identifying information for the rental property.

FIGS. 9-10 show the further development of a tenant's records 18. Besides the preliminary information about a tenant, a landlord can be required to submit all tenant 36 updates into the secured website 10. This information can include changes to the lease information, address changes, and changes to the tenant's 36 identifying information. The exemplary tenant 36 fact report shows the tenant's 36 information including the tenant's 36 name, address and other tenant 36 identifying information. Further updates can be placed in a tenant 36 fact report. As previously mentioned, these updates can reflect rent increase and the name of the rental property network member 34 that made the update. This example of the tenant 36 fact report shows the tenant 36 information being placed into sections A, B, C and D. Each section shows the tenant 36 formation including basic details of the lease, number of inquiries with regards to the tenant 36 and notations and summarizing the details all documents in the evidence report.

Figure 11:
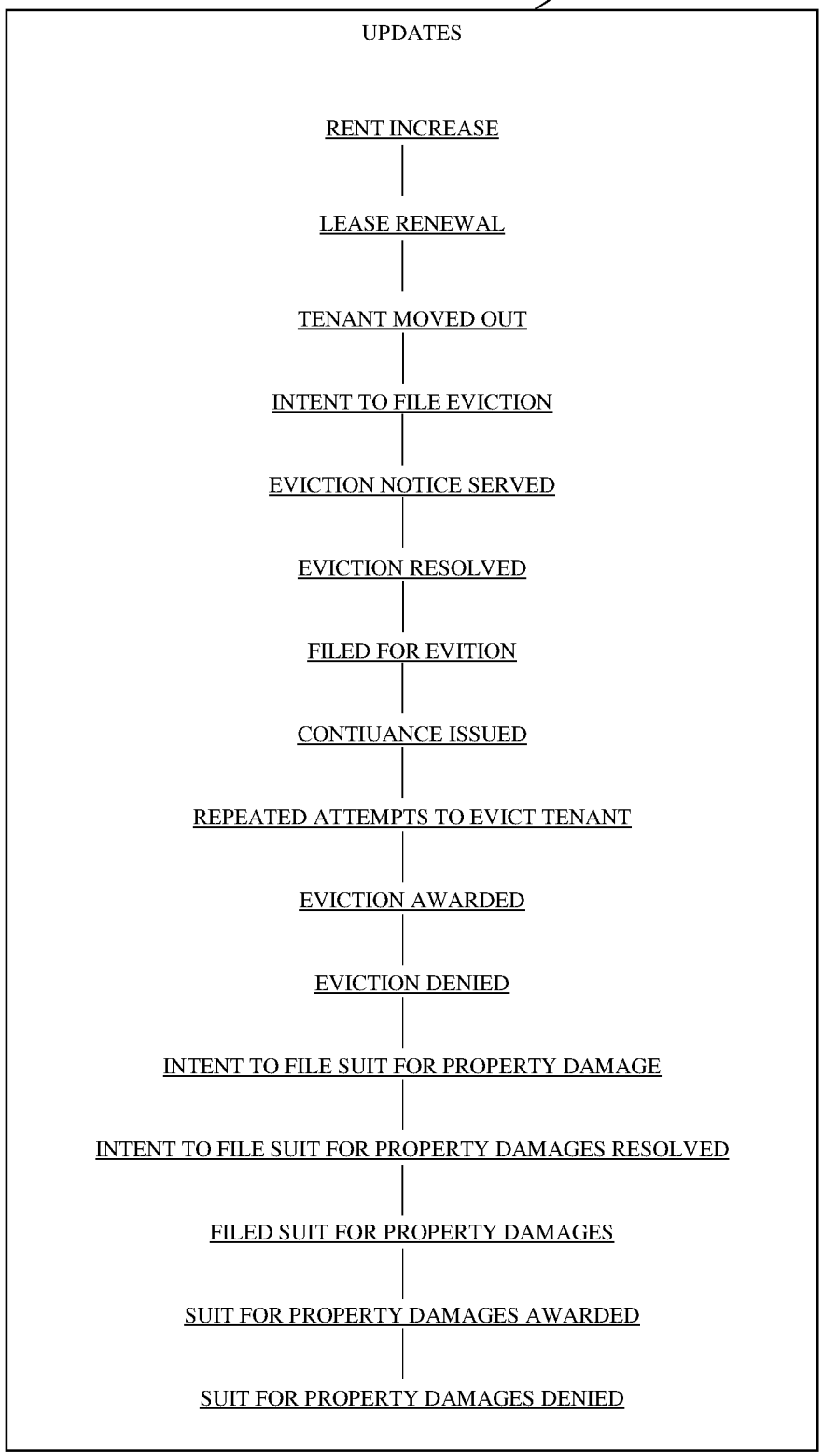
FIG. 11 shows the real-time status information of existing tenant on the secured website.
Figure 12:
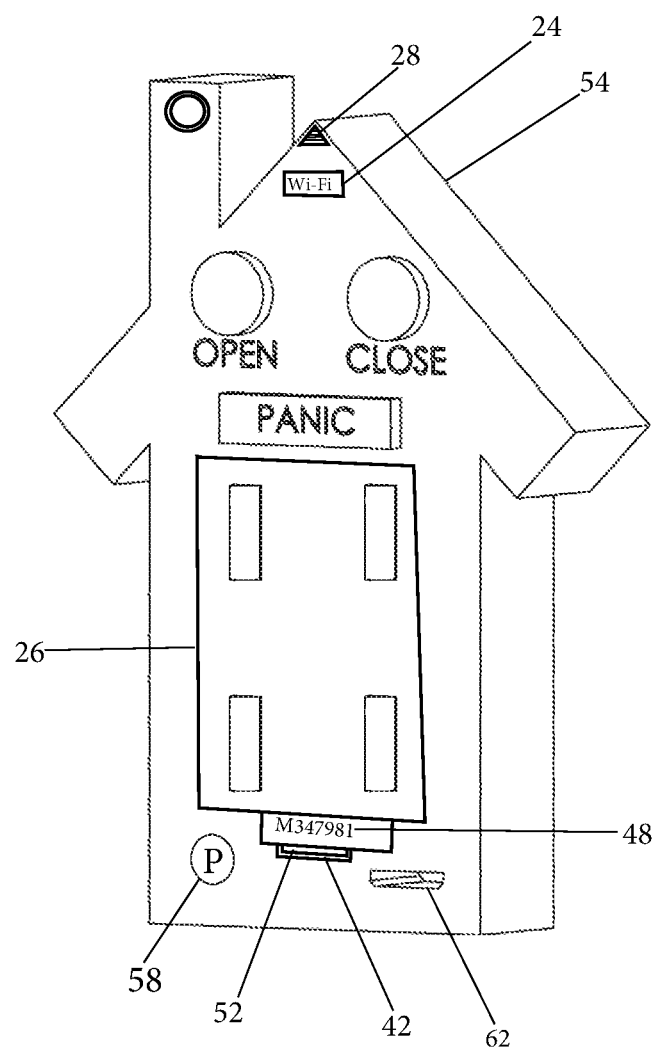
FIG. 12 is a partially exploded perspective view of a key fob in accordance with a preferred embodiment of the present invention.
Figure 13:
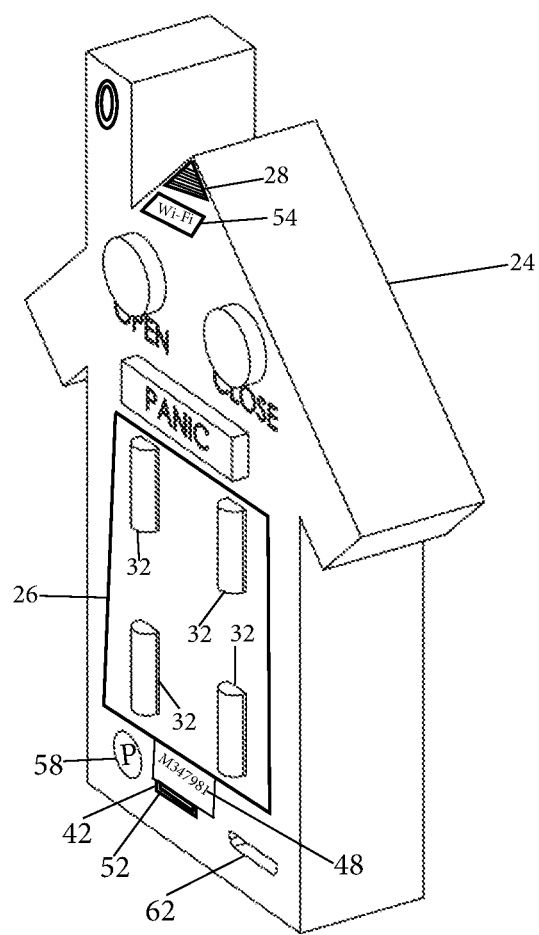
FIG. 13 is a partially exploded perspective view of a key fob in accordance with a preferred embodiment of the present invention.

FIG. 11 is an example of a tenant's 36 evidence locker. Notations and summaries in the tenant 36 fact report provide the fact of the existence of a tenant 36 evidence locker. The tenant 36 evidence locker can include notes documenting previous discussions between the landlord and tenant 36, summons, lease citations, decrees, judgments, and police reports.

What is claimed is:

1. A method for providing rental property network members and existing tenants real-time response alerts to rental property database inquiries, rental property status, and rental property updates comprising:

a secured website being stored on an authenticating server;

said secured website having said rental property database and storing rental property information, tenant records, records of said rental property network members, notices, and specific requests;

said secured website being operable to send signals to a key fob;

said key fob being a programmable one-way telecommunication device having a color-coded alert board with a top surface, a plurality of depressable color signals being disposed on said top surface of said color-coded alert board, audio output capabilities, and vibration capabilities coordinated with specified changes on said secured website; said color-coded alert board informing said rental property network members and said existing tenants to changes to said rental property information;

said depressable color signals being raised and protruding outwardly from said color-coded alert board;

said depressable color signals producing flashing light signals and non-flashing light signals and having a body with a half cylinder shape upon which a user can place a finger and manually control the operation of said depressable color signals; said key fob receiving a plurality of flashing light signal combinations dependent on the flashing color signal of at least one of said color signals on said color-coded alert board; said key fob receiving a plurality of non-flashing light signal combinations dependent on the flashing color signal of at least one of said depressable color signals;

said key fob having a memory system holding a 40-bit code for reading and executing a plurality of program codes;

said rental property network members and said existing tenants receiving authenticating information from said secured website and registering said key fob with said service provider to enable two-factor authentication for future logins;

said secured website generating one-time-passcodes that alphabetically identify said rental property network providers and said existing tenants; said one-time-passcode being used in addition to a log-in authentication username and password; said one-time-passcode being displayed on said key fob.

2. The method of claim 1 wherein said real-time response alerts to said rental property database inquiries include said key fob informing said rental property network members and said existing tenants to said color signals that are displayed at the bottom center of said key fob.

3. The method of claim 1 wherein at least one of said colors signals on said key fob flashes while indicating that said tenant records are cleared.

4. The method of claim 1 wherein said audio output is received and at least one of said color signals on said key fob flashes while indicating that said tenant records are cleared.

5. The method of claim 1 wherein said audio output is received and at least one of said color signals on said key fob flashes while indicating that said existing tenant has been served said notices.

6. The method of claim 1 wherein said key fob vibrates and said existing tenants receive a non-flashing signal of at least one of said color signals while indicating that said existing tenants have said rental property information that is completed and prepared for viewing.

7. The method of claim 1 wherein said key fob vibrates and said existing tenants receive a flashing signal of at least one of said color signals indicating that said specific requests on said secured website has been completed.

8. The method of claim 1 wherein at least one of said color signals produce a variable flash pattern if there are any changes to said rental property information relating to said existing tenants.

9. The method of claim 1 wherein said memory system uses a non-volatile memory card with assigned unit values.

10. The method of claim 1 wherein said key fob has Wi-Fi connectivity.

11. The method of claim 1 wherein said key fob has Bluetooth connectivity.

12. The method of claim 1 wherein said key fob has a chargeable power source.

13. The method of claim 1 wherein said key fob has a universal serial bus port.

14. The method of claim 1 wherein said key fob is configurable to change said one-time-passcode code at specified time intervals.

15. The method of claim 1 wherein said key fob is formed in the shape of a house.

\* \* \* \* \*